US011300668B1

(12) United States Patent
Colarelli, III et al.

(10) Patent No.: US 11,300,668 B1
(45) Date of Patent: Apr. 12, 2022

(54) METHOD FOR COLLECTIVE CALIBRATION OF MULTIPLE VEHICLE SAFETY SYSTEM SENSORS

(71) Applicant: Hunter Engineering Company, Bridgeton, MO (US)

(72) Inventors: Nicholas J. Colarelli, III, Frontenac, MO (US); Timothy A. Strege, Sunset Hills, MO (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 246 days.

(21) Appl. No.: 16/455,414

(22) Filed: Jun. 27, 2019

Related U.S. Application Data

(63) Continuation of application No. 15/492,636, filed on Apr. 20, 2017, now Pat. No. 10,365,355.

(60) Provisional application No. 62/325,884, filed on Apr. 21, 2016.

(51) Int. Cl.
*G01S 7/497* (2006.01)
*G07C 5/00* (2006.01)
*G01S 17/931* (2020.01)

(52) U.S. Cl.
CPC ............ *G01S 7/497* (2013.01); *G01S 17/931* (2020.01); *G07C 5/008* (2013.01)

(58) Field of Classification Search
CPC ........ G01S 7/497; G01S 17/936; G07C 5/008
See application file for complete search history.

(56) References Cited

U.S. PATENT DOCUMENTS

| | | | |
|---|---|---|---|
| 4,607,575 A * | 8/1986 | Bryda | G05D 1/0229 104/304 |
| 7,337,650 B1 | 3/2008 | Preston et al. | |
| 8,970,834 B2 | 3/2015 | Soininen et al. | |
| 9,279,670 B2 | 3/2016 | Schommer et al. | |
| 2010/0235129 A1 | 9/2010 | Sharma et al. | |
| 2010/0332181 A1* | 12/2010 | Jones | G01B 11/27 702/151 |
| 2013/0342686 A1* | 12/2013 | Wagmann | G01B 11/2755 348/139 |
| 2015/0049193 A1* | 2/2015 | Gupta | G03B 43/00 348/148 |
| 2018/0100783 A1* | 4/2018 | Stieff | G01S 7/4052 |
| 2019/0257949 A1* | 8/2019 | Bravo Orellana | G01S 17/48 |

OTHER PUBLICATIONS

Luettel et al., Autonomous Ground Vehicles—Concepts and a Path to the Future, pp. 1831-1839, Proceedings of the IEEE, vol. 100, May 13, 2012.
Lytrivis et al., Sensor Data Fusion in Automotive Applications, Sensors and Data Fusion, Nada Milisavljevic (Ed.), ISBN 978-3-902613-52-3, I-Tech, Feb. 2009, Available from http://www.intechopen.com/books/sensor_and_data_fusion/sensor_data_fusion_in_automotive_applications.

* cited by examiner

*Primary Examiner* — Rami Khatib
(74) *Attorney, Agent, or Firm* — Sandberg Phoenix & von Gontard, P.C.

(57) ABSTRACT

A method for transforming track representations associated with a spatial position and movement of objects or features observed in an external environment surrounding a vehicle from a vehicle-centric spatial frame of reference, such as associated with a vehicle body or centerline, into a common vehicle movement spatial frame of reference such as may be associated with a vehicle thrust line or vehicle thrust angle.

10 Claims, 4 Drawing Sheets

METHOD FOR COLLECTIVE CALIBRATION OF MULTIPLE VEHICLE SAFETY SYSTEM SENSORS

CROSS-REFERENCE TO RELATED APPLICATIONS

The present application is related to, and claims priority from, co-pending U.S. patent application Ser. No. 15/492,636 filed on Apr. 20, 2017, which in turn is related to and claims priority from U.S. Provisional Application Ser. No. 62/325,884 filed on Apr. 21, 2016, both of which are herein incorporated by reference.

STATEMENT REGARDING FEDERALLY SPONSORED RESEARCH

Not Applicable.

BACKGROUND OF THE INVENTION

The present application is related to onboard vehicle safety and monitoring systems configured to observe the environment surrounding the vehicle, and in particular, to the calibration of tracking data obtained from multiple onboard sensor systems into fused tracks for external objects relative to a determined axis or line associated with movement of the vehicle, ensuring that external objects observed by the multiple onboard sensors are interpreted as having cohesive spatial tracks relative to the moving vehicle, and enabling comprehensive and consistent situational awareness by the onboard vehicle safety systems.

Onboard vehicle safety systems configured to observe the external environment surrounding a moving vehicle are rapidly becoming commonplace on new vehicles entering the market. These include numerous safety systems, such as forward-looking collision avoidance systems, lane departure warning systems, pedestrian avoidance systems, and blind spot monitoring systems. Additional systems are associated with autonomous or semi-autonomous driving of the vehicle, such as adaptive cruise control or autopilot systems. Each of these systems operates by observing or receiving data from a field of view external to the vehicle, and reacts to objects observed or detected within that field of view, such as the presence (or absence) of nearby vehicles, pedestrians, lane markings, curbs, street signs, etc. The various systems may operate in various regions of the electromagnetic spectrum, using visible light, infrared light, LIDAR, or radar to generate images or acquire data such as range measurements.

As the autonomy of vehicles increases, the input to a primary vehicle sensor control system, or multi-domain controller, from multiple onboard sensor systems monitoring the vehicle's external environment becomes more important. In turn, it becomes critical for the primary vehicle sensor control system to successfully fuse the local track information for objects obtained from multiple sensors together to provide meaningful tracking data for the objects in the environment around the vehicle. By further combining the fused tracking data with mapping and navigation data, the primary vehicle sensor control system can make or confirm various decisions regarding how the vehicle moves or interacts with the surrounding environment. Fusing the local track information from multiple sensors further enables the primary vehicle sensor control system to maintain functionality in the event one or more of the onboard sensor systems becomes inoperable, such as due to snow or rain obscuring the field of view, as objects in proximity to the vehicle are observed by multiple sensors, providing redundant information. However, it is necessary to ensure that input provided to the primary vehicle sensor control system from each onboard sensor is aligned or fused within a common spatial frame of reference and temporal reference, enabling a comprehensive determination of the relative position and movement of the observed objects.

If two vehicle onboard sensor systems observe the same object in their respective fields of view, but each sensor interprets the observation differently, a primary vehicle sensor control system would be unable, without track fusion, to accurately determine either the relative position or relative movement (i.e. track) of the object in relation to the vehicle, potentially leading to an unsafe action on the part of the vehicle. Similarly, if an observed object were to transition from the field of view of one vehicle onboard sensor system and into the field of view of a second vehicle onboard sensor system, either due to vehicle motion or motion of the object itself, resulting in a sudden change in the object's interpreted position or relative movement to the vehicle, the primary vehicle sensor control system could react in an unpredictable manner, particularly if the object was suddenly interpreted as a collision threat when it previously was not. Hence, the process of track fusion within the primary vehicle sensor control system receives the information from each vehicle onboard sensor, determines when two or more sensors are observing the same object, and integrates the associated information into a common or fused track for the object in a common spatial frame of reference and temporal reference tied to the vehicle body center point or centerline.

Integrating the input from multiple onboard vehicle sensors into fused tracks for objects within a common spatial frame of reference tied to the vehicle body center point or centerline provides the primary vehicle sensor control system with a unified environment in which to detect potential hazards, collisions, or other threats to the vehicle. However, when the vehicle is in motion various factors can influence the straight line direction of travel for the vehicle, such that it deviates from a vector projected either from the vehicle body center point or along the vehicle centerline. Accordingly, there is a need to provide a means by which information (in the form of raw data or localized object tracking) acquired from multiple onboard sensor systems on a vehicle, correlated into fused tracks of external objects within a common spatial frame of reference associated with the vehicle body or centerline, can be further transformed into fused tracks of the objects within a common variable spatial frame of reference associated with an actual straight-line movement direction of the vehicle.

BRIEF SUMMARY OF THE INVENTION

In one embodiment, a method of the present invention transforms one or more fused tracks associated with the spatial position and movement of objects or features observed in an external environment surrounding a vehicle from a vehicle-centric spatial frame of reference, such as associated with a vehicle body or centerline, into a vehicle movement spatial frame of reference associated with a vehicle wheel assembly orientation, such as a vehicle thrust line or vehicle thrust angle. Initially, the vehicle thrust line or vehicle thrust angle is determined relative to the vehicle centerline via a wheel alignment measurement process and a representation thereof stored in an onboard data store accessible by the primary vehicle sensor control system. During vehicle operation, as external objects are observed and tracked by individual onboard vehicle sensors, the primary vehicle sensor control system receives the tracking data from the individual onboard vehicle sensors, and establishes associated fused tracks for the external objects within a common spatial frame of reference associated with the vehicle body or centerline. Each fused track is further transformed by the primary vehicle sensor control system into a spatial frame of reference associated with an actual straight-line movement direction of the vehicle by adjusting for an identified deviation between the determined vehicle thrust line or thrust axis contained in the onboard data store, and the vehicle body or centerline, ensuring that each fused track associated with an object external to the vehicle accurately represents the relative spatial relationships and movements between the object and the moving vehicle.

In a further method of the present disclosure, the stored representation of the vehicle thrust line or vehicle thrust angle accessible by the primary vehicle sensor control system is updated or revised in response to data communicated from a vehicle service system, such as an external vehicle wheel alignment measurement system or inspection system. The communicated data identifies a change, correction, or update to the vehicle thrust line or vehicle thrust angle, such as due to a change in wheel alignment on the vehicle. The updated or revised representation of the vehicle thrust line or vehicle thrust angle is subsequently accessed by and utilized by the primary vehicle sensor control system to transform fused tracks associated with object external to the vehicle into the spatial frame of reference associated with an actual straight-line movement direction of the vehicle, without requiring recalibration of individual onboard vehicle sensors in response to the change, correction or update to the vehicle thrust line or thrust angle.

In yet a further embodiment of the present disclosure, the representation of the vehicle thrust line or vehicle thrust angle stored in the accessible data store is replaced, updated, or revised with a new representative value communicated from an external vehicle wheel alignment measurement or inspection system following a change in the vehicle thrust line or vehicle thrust angle. Such a change may result inadvertently from changes in the vehicle suspension system occurring over time, or may be intentional, resulting from adjustments to various vehicle wheel alignment angles during a vehicle service procedure. By updating the accessible data store with the new representation, one or more individual onboard sensor systems previously calibrated with reference to the prior vehicle thrust line or thrust angle can access the data store and refine or compensate acquired track data to account for a change from the prior vehicle thrust line or thrust angle without the need to be individually re-calibrated to the new vehicle thrust line or vehicle thrust angle.

In another embodiment of the present disclosure, a vehicle service system is configured to facilitate the calibration of a selected onboard vehicle safety system sensor relative to a common frame of reference, such as relative to a vehicle thrust line or vehicle thrust angle. An alignment of the selected onboard vehicle safety system sensor is measured to determine an offset or correction required to calibrate to the common frame of reference. The selected onboard vehicle safety system sensor, once calibrated, defines the common frame of reference for tracking data associated with an external object acquired by at least one additional onboard vehicle safety system sensor. Additional onboard vehicle safety system sensors are either aligned relative to the calibrated onboard vehicle safety system sensor such that tracking data is generated directly in the common frame of reference, or tracking data generated by the additional onboard vehicle safety system sensors is transformed from local frames of reference previously aligned relative to the calibrated onboard vehicle safety system sensor into the common frame of reference using a determined offset or correction, facilitating the establishment of fused tracks associated with external objects.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
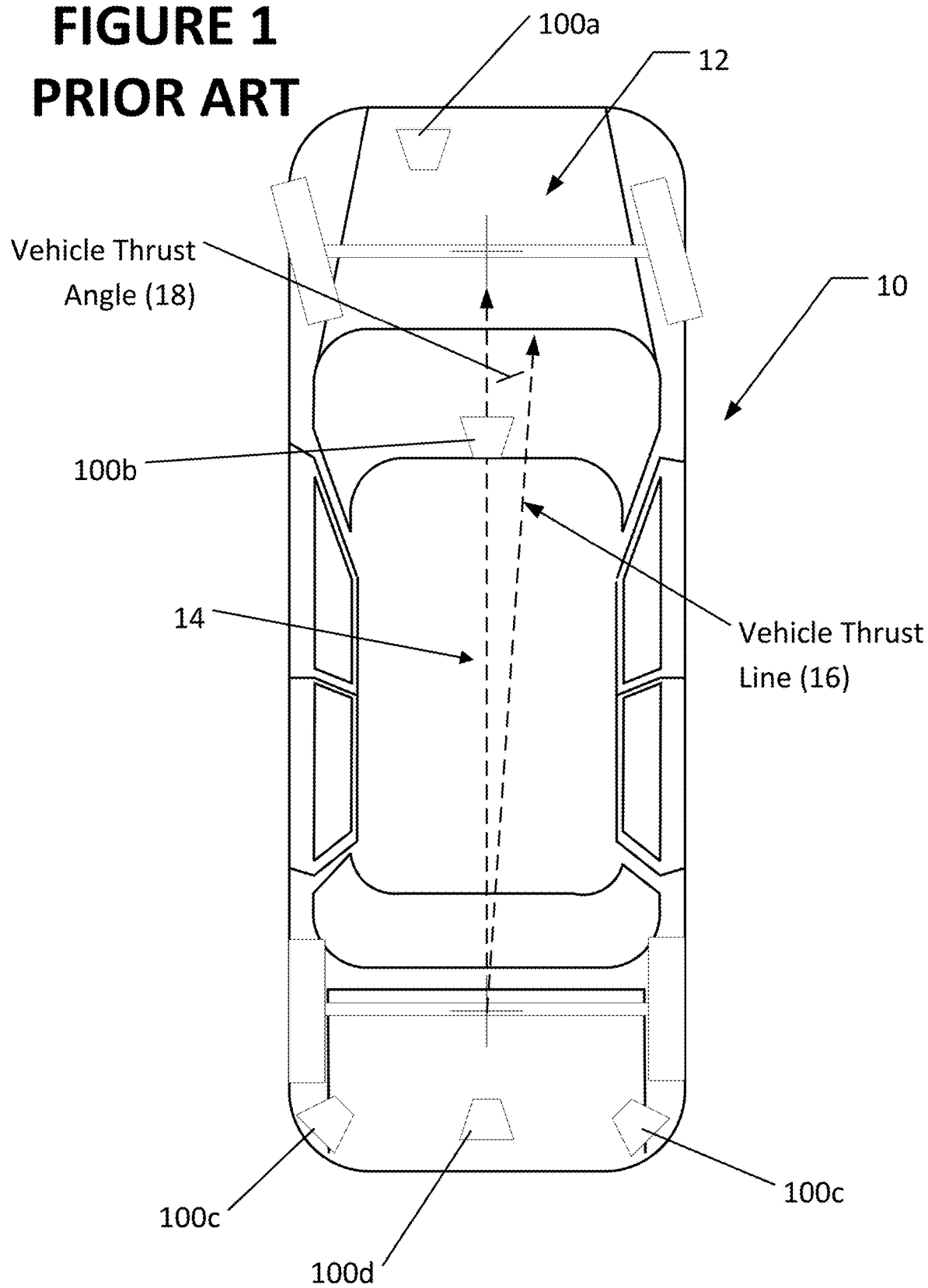
FIG. 1 is a top plan view of a prior art vehicle, illustrating exemplary placement of onboard sensor systems, a centerline, and a thrust line offset from the centerline by a thrust angle (exaggerated for illustration purposes)

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

With reference to the several figures, and to FIG. 1 in particular, a vehicle 10 is shown in which one or more onboard sensor systems 100 are configured to observe the external environment in proximity to the vehicle in order to detect the presence of objects or features. These onboard sensor systems may include, but are not limited to, adaptive cruise control (ACC) sensors 100a, lane departure warning (LDW) sensors (100b), blind spot monitoring sensors (100c), and backup cameras (100d). Each onboard sensor system 100 is calibrated (shown by 101) according to manufacture guidelines in a position and/or orientation which is relative to a selected vehicle-centric spatial reference, such as a component of the vehicle body 12, or to the vehicle centerline 14. This calibration 101 may be mechanical (i.e., by alignment of a camera axis), or electronic (i.e., offset values stored in an electronic memory). Preferably, the vehicle-centric spatial reference is based on a vehicle feature 12, 14 which does not change over time or by adjustment, such as a vehicle centerline, so as to reduce the need to frequently recalibrate a large number of onboard vehicle sensor systems 100 following an adjustment to the vehicle 10. Data acquired by the onboard sensor systems 100 which is associated with the position of, and optionally the motion of, an observed or detected external object (other vehicles, pedestrians, obstacles, etc.) or feature (lane markings, roadway edges, etc.) is initially processed to establish a representation 102 of the objects path, trajectory or track relative to the observing onboard vehicle sensor system 100 (and hence, relative to the vehicle-centric spatial reference). These representations 102 are referred to as local tracks, and are established directly by the observing onboard vehicle sensor systems 100, or are established indirectly at a primary vehicle sensor control system 200 from observation data conveyed from the various onboard sensor systems 100, such as shown in U.S. Pat. No. 7,337,650 B1 to Preston et al.

When two or more local tracks of data representative of a common object are observed or detected by multiple onboard vehicle sensor systems 100 they are communicated to the primary vehicle sensor control system 200, the local tracks are further evaluated by the primary vehicle sensor control system 200 to generate a single unified representation 202 of the common object's position and movement within the common vehicle-centric spatial frame of reference associated with the vehicle body or centerline. This evaluation process is referred to as track fusion, and the resulting unified representation 202 of an object's position or motion is referred to as a fused track. The track fusion process consolidates local track data 102 from multiple sources 100 into a single fused track representation 202 for the observed object, enabling the primary vehicle sensor control system 200 to respond to the fused track representation 202 in an appropriate manner (i.e., collision avoidance, path prediction, etc.) for objects in proximity to the vehicle 10, utilizing a vehicle body or vehicle centerline frame of reference. However, the track fusion process does not inherently account for actual straight-line movement of the vehicle 10. Failing to account for the actual straight-line movement of the vehicle 10 can result in a decreased accuracy when predicting potential collisions or threats to the vehicle 10 from external objects, particularly for objects which are observed at greater distances from the vehicle 10.

Figure 2:
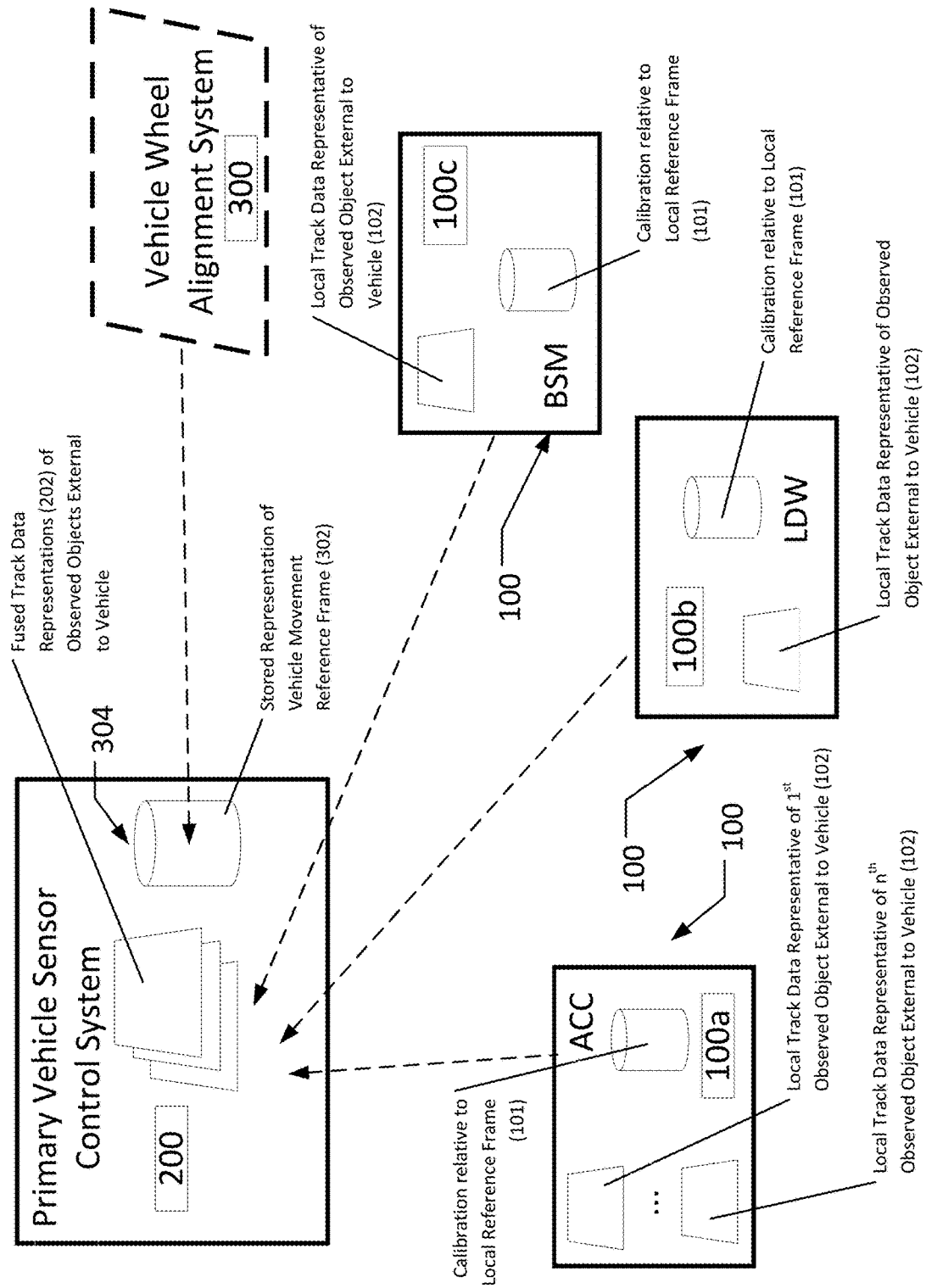
FIG. 2 is a block diagram representing the interaction of several onboard vehicle sensor systems with the primary vehicle sensor control system for tracking objects external to the vehicle.
Figure 3:
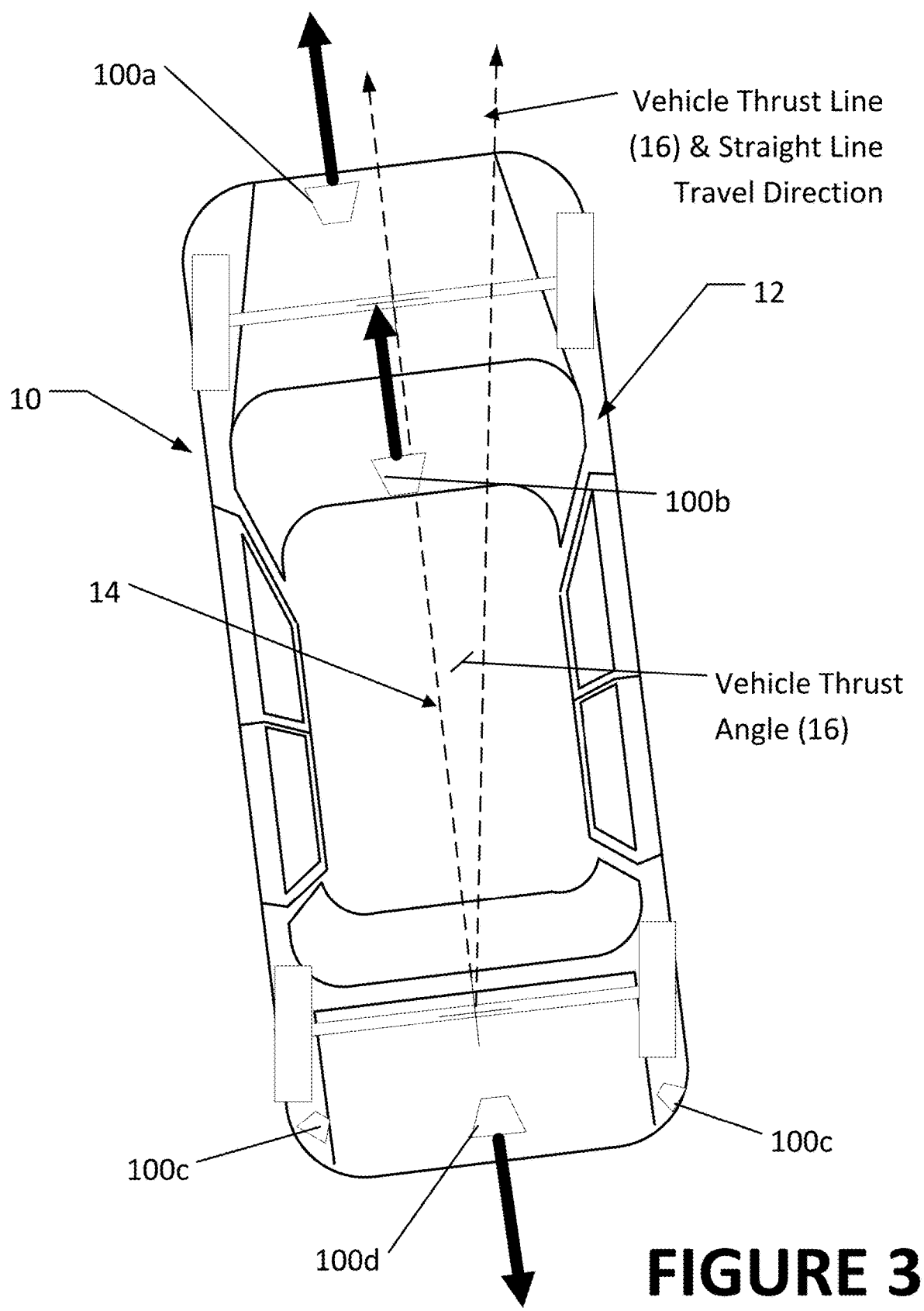
FIG. 3 is a top plan view similar to FIG. 1, illustrating alignment of several onboard sensor system to a local frame vehicle centerline frame of reference (angles have been exaggerated for clarity)
Figure 4:
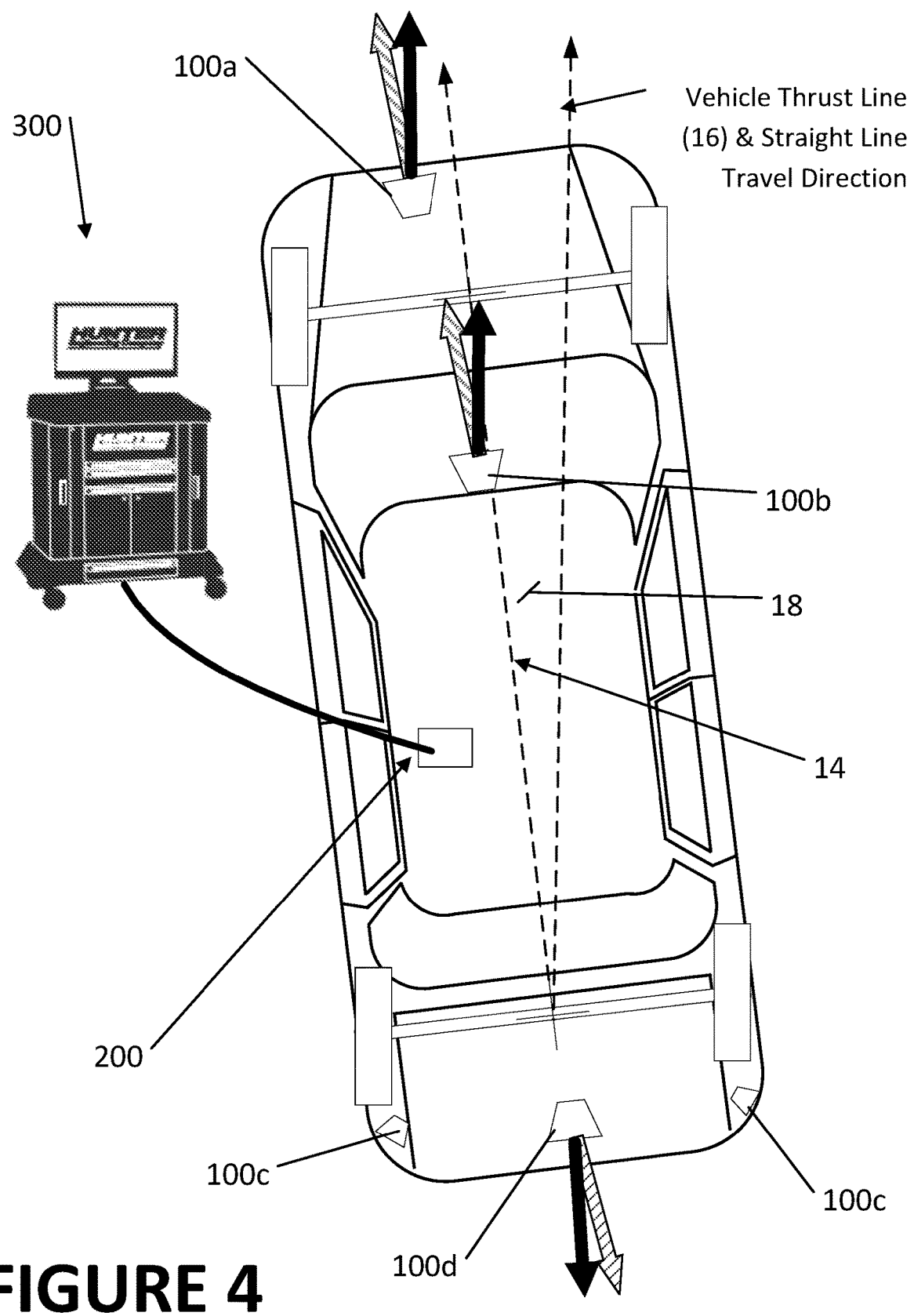
FIG. 4 illustrates the vehicle of FIG. 3, in communication with a vehicle wheel alignment measurement or inspection system to refine the alignment of onboard sensor systems to a vehicle thrust line frame of reference (angles have been exaggerated for clarity).

In one embodiment of the present disclosure, illustrated generally in FIGS. 2-4, the fused track representations 202 generated by the primary vehicle sensor control system 200 and representative of observed objects external to the vehicle 10 are further processed by the primary vehicle sensor control system 200 to shift from local frames of reference, such as vehicle-centric frames of reference (shown in FIG. 3), into a common vehicle-movement spatial frame of reference such as one associated with a vehicle thrust line 16 or vehicle thrust angle 18 (as shown in FIG. 4). Initially, a representation 302 of the vehicle-movement spatial frame of reference, such as a vehicle thrust line 16 or vehicle thrust angle 18 is determined relative to the local vehicle-centric frame of reference, such as the vehicle centerline 14, using a vehicle wheel alignment measurement system 300 having a suitably configured processing system, via any suitable wheel alignment measurement process. The representation 302 is stored in a data store 304 associated with, or accessible by, the primary vehicle sensor control system 200 during vehicle operation, enabling, in one embodiment, the primary vehicle sensor control system 200 to refine each fused track to account for any deviation or difference between any vehicle-centric spatial frame of reference and the vehicle movement spatial frame of reference. In most cases, this deviation or difference will be constrained to a single plane in three-dimensional space. By refining each local track representation 102 from the vehicle-centric spatial frames of reference to the vehicle movement spatial frame of references, the primary vehicle sensor control system increases the accuracy with which the fused tracks 202 associated with objects external to the vehicle represent the relative spatial relationships and movements between the observed objects and the moving vehicle 10.

In a further embodiment of the present disclosure, the representation of the vehicle-movement frame of reference, such as the vehicle thrust line 16 or vehicle thrust angle 18 stored in the accessible data store is updated with a new representative value following a change in the vehicle thrust line 16 or vehicle thrust angle 18 as measured by a vehicle service system, such as a wheel alignment system 300 or other vehicle inspection system. Such a change may result inadvertently from changes in the vehicle suspension system occurring over time, or may be intentional, resulting from adjustments to various vehicle wheel alignment angles. By updating the accessible data store with the new representation 302, the primary vehicle sensor control system 200 can continue to transform each fused track 202 from the local vehicle-centric spatial frames of reference to the vehicle movement spatial frame of reference, without the need to re-calibrate each individual onboard sensor system 100 to a new vehicle thrust line 16 or vehicle thrust angle 18.

In yet a further embodiment of the present disclosure, the representation 302 of the vehicle-movement frame of reference, such as the vehicle thrust line 16 or vehicle thrust angle 18 stored in the accessible data store is replaced, updated, or revised with a new representative value communicated from the processing system of a vehicle service system, such as an external vehicle wheel alignment measurement system 300 or other inspection system, following a change in the vehicle thrust line 16 or vehicle thrust angle 18. Such a change may result inadvertently from changes in the vehicle suspension system occurring over time, or may be intentional, resulting from adjustments to various vehicle wheel alignment angles during a vehicle service procedure. By updating the accessible data store with the new representation 302 or the amount of change, one or more individual onboard sensor systems 100 previously calibrated with reference to the prior vehicle thrust line 16 or thrust angle 18 can access the stored representation 302 and directly refine or compensate representations 102 of acquired track data, prior to any track fusion processing, to account for the change from the prior vehicle thrust line 16 or thrust angle 18 without the need to be specifically re-calibrated to a new vehicle thrust line or vehicle thrust angle. Alternatively, the new representation 302, or the amount of change may be provided to the primary vehicle sensor control system 200 and applied to either the individual representations 102 of acquired track data when they are communicated from the individual onboard sensor systems 100, or to the results from the track fusion processing.

In another embodiment of the present disclosure, a vehicle service system is configured to facilitate the calibration of a selected onboard vehicle safety system sensor 100 relative to a vehicle-movement frame of reference, such as relative to a vehicle thrust line 16 or vehicle thrust angle 18. An alignment of the selected onboard vehicle safety system sensor 100 is measured to determine an offset or correction required to calibrate an output of the selected onboard vehicle safety system sensor 100 to the vehicle-movement frame of reference. The selected onboard vehicle safety system sensor 100, once calibrated, defines a common frame of reference for tracking data associated with an external object acquired by at least one additional onboard vehicle safety system sensor 100. Additional onboard vehicle safety system sensors 100 are either aligned relative to the initial calibrated onboard vehicle safety system sensor 100, such that track representations 102 are generated directly in the common vehicle-movement frame of reference, or track representations 102 generated by the additional onboard vehicle safety system sensors is transformed from local vehicle-centric frames of reference previously aligned to the initially calibrated onboard vehicle safety system sensor 100 into the new common vehicle-movement frame of reference using the determined offsets or corrections, facilitating the establishment of fused track representations 202 associated with external objects in a single common vehicle-movement frame of reference.

If the determined offsets or corrections are utilized to transform track representations 102 from the additional onboard vehicle safety system sensors 100 into the common vehicle-movement frame of reference, the offsets, correction values, or representations 302 of the vehicle movement frame of reference may be stored in a memory 304 accessible by the primary vehicle control system 200, or directly by the additional onboard vehicle safety system sensors 100. Correspondingly, the offsets, correction values, or representations 302 may be utilized with tracking data received at the primary vehicle control system 200, or may be utilized directly by each additional onboard vehicle safety system sensor 100 on the track representations 102 generated prior to communication to the primary vehicle control system 200 for creation of any fused track representations 202.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for calibrating, with a vehicle service system, a plurality of onboard vehicle safety system sensors relative to a vehicle-movement spatial frame of reference for tracking spatial position and movement of an object external to a vehicle, comprising:

measuring, with the vehicle service system, an alignment of a selected one of said plurality of onboard vehicle safety system sensor relative to said vehicle-movement spatial frame of reference;

responsive to said measured alignment, adjusting, with the vehicle service system, said selected onboard vehicle safety system sensor relative to said vehicle-movement spatial frame of reference; and subsequent to said adjustment of said selected onboard vehicle safety system sensor, adjusting at least one additional onboard vehicle safety system sensor in said plurality of onboard vehicle safety system sensors relative to said selected onboard vehicle safety system sensor such that a track representation of said object generated by said at least one additional onboard vehicle safety system sensor aligns with a track representation of said object generated by said selected onboard vehicle safety system sensor to form a fused track representation within said vehicle-movement spatial frame of reference.

2. The method of claim 1 wherein said at least one additional onboard vehicle safety system sensor is in relative alignment with said selected onboard vehicle safety system sensor prior to said adjustment of said selected onboard vehicle safety system sensor; and wherein adjusting said at least one additional onboard vehicle safety system sensor relative to said selected onboard vehicle safety system sensor restores said relative alignment following said adjustment of said selected onboard vehicle safety system sensor.

3. The method of claim 2 wherein said relative alignment is predetermined.

4. The method of claim 2 where said relative alignment is measured prior to said adjustment of said selected onboard vehicle safety system sensor.

5. The calibration method of claim 1 wherein said vehicle-movement spatial frame of reference is a vehicle thrust line frame of reference.

6. The method of claim 1 wherein adjusting said selected onboard vehicle safety system sensor includes storing an offset value or correction value in an accessible memory onboard said vehicle, said offset value or correction value utilized to adjust said at least one additional onboard vehicle safety system sensor.

7. The method of claim 1 wherein adjusting said selected onboard vehicle safety system sensor includes altering an alignment of said selected onboard vehicle safety system sensor relative to said vehicle-movement spatial frame of reference; and wherein adjusting said at least one additional onboard vehicle safety system sensor includes altering an alignment said at least one additional onboard vehicle safety system sensor relative to said selected onboard vehicle safety system sensor.

8. A method for calibrating, with a vehicle service system, a plurality of onboard vehicle safety system sensors relative to a vehicle-movement spatial frame of reference for tracking spatial position and movement of an object external to a vehicle, comprising:

measuring, with the vehicle service system, an alignment of a selected onboard vehicle safety system sensor relative to an axis of said vehicle-movement spatial frame of reference, said measuring establishing an alignment offset between an orientation of said selected onboard vehicle safety system sensor and said axis of said vehicle-movement spatial frame of reference;

communicating, from said vehicle service system to a primary vehicle sensor control system onboard the vehicle undergoing inspection, a representation of said established alignment offset; and utilizing said communicated representation of said established alignment offset to refine a track representation associated with an object external to said vehicle from a local frame of reference into said vehicle-movement spatial frame of reference, said track representation generated in said local frame of reference by at least one additional onboard vehicle safety system sensor which is aligned relative to said selected onboard vehicle safety system sensor.

9. The calibration method of claim 8 wherein said vehicle-movement spatial frame of reference is a vehicle thrust line frame of reference, and wherein said axis of said vehicle-movement spatial frame of reference is a vehicle thrust axis or vehicle thrust line.

10. The calibration method of claim 8 wherein said step of communicating includes storing said representation of said established alignment offset in a data store accessible by said primary vehicle sensor control system.

* * * * *